(12) United States Patent
Suzuki

(10) Patent No.: US 6,450,448 B1
(45) Date of Patent: Sep. 17, 2002

(54) AIRPLANE WHEEL UNIT

(76) Inventor: Toshimi Suzuki, 2655-1 Murakami, Yachiyo-shi, Chiba-ken 276-0028 (JP)

( * ) Notice: Subject to any disclaimer, the term of this patent is extended or adjusted under 35 U.S.C. 154(b) by 0 days.

(21) Appl. No.: 09/931,565

(22) Filed: Aug. 17, 2001

(51) Int. Cl.[7] .................................................. B64C 7/00
(52) U.S. Cl. ............................ 244/104 FP; 244/100 R; 244/102 R; 244/102 A; 244/103 R; 244/104 R; 244/103 S; 244/103 W
(58) Field of Search ......................... 244/100 R, 102 A, 244/103 R, 104 R, 104 FP, 103 S, 103 W, 100 A

(56) References Cited

U.S. PATENT DOCUMENTS

| | | | | |
|---|---|---|---|---|
| 1,546,789 A | * | 7/1925 | Novak | 244/103 S |
| 2,451,453 A | * | 10/1948 | Tuxhorn | 188/293 |
| 2,665,087 A | * | 1/1954 | Clover | 244/103 S |
| 3,056,567 A | * | 10/1962 | Smith et al. | 244/103 S |
| 4,385,739 A | * | 5/1983 | Soderberg | 244/103 S |
| 4,659,039 A | * | 4/1987 | Valdes | 244/103 S |
| 4,732,350 A | * | 3/1988 | Lamont | 244/103 S |
| 5,104,063 A | * | 4/1992 | Hartley | 244/103 R |
| 5,165,624 A | * | 11/1992 | Lewis et al. | 244/103 S |
| 5,417,387 A | * | 5/1995 | Jennings | 244/103 S |
| 6,032,900 A | * | 3/2000 | Smith | 244/103 S |
| 6,086,017 A | * | 7/2000 | Al-Thani | 244/103 S |

FOREIGN PATENT DOCUMENTS

| | | |
|---|---|---|
| JP | 50-7300 | 1/1975 |
| JP | 62-258894 | 11/1987 |
| JP | 63-111395 | 7/1988 |
| JP | 64-1199 | 1/1989 |

* cited by examiner

Primary Examiner—Charles T. Jordan
Assistant Examiner—Stephen A. Holzen
(74) Attorney, Agent, or Firm—Lorusso & Loud

(57) ABSTRACT

A drive unit for a wheel of an airplane landing gear includes a pneumatic motor having a first impeller which is driven by pneumatic energy of compressed air and a second impeller which is turned by the expanded exhaust from the first impeller. These impellers are fixed to the wheel axle and turn together with a third impeller within an air-tight casing. A fixed vane is provided between the second and third impellers. The pneumatic motor has two functions, (1) as a pneumatic motor which is turned by the pneumatic energy of compressed air and, (2) as a vacuum brake, creating a vacuum within the airtight casing by closing the inlet for the compressed air and driving the impellers by the power of the turning wheel of the landing gear, driven by ground contact upon landing.

6 Claims, 4 Drawing Sheets

AIRPLANE WHEEL UNIT

BACKGROUND OF THE INVENTION

FIELD OF THE INVENTION

The present invention relates to a drive unit for a wheel of an airplane landing gear.

Conventionally, the wheel unit of an airplane is a simple unit in which a friction brake having many disks was attached to the inside of a tire wheel and does not have a strong drive unit to control the running speed of the airplane at the time of takeoff and landing.

Consequently, the running distance at the time of takeoff can not be shortened by the wheel unit and the wheel can not be turned at a high speed in synchronization with landing speed.

Furthermore, the conventional brake unit, when used to reduce speed immediately after landing, generates a large amount of heat by friction between the brake disks and, therefore, many transport airplanes let down the flaps provided at the rear periphery of the main wings and then use the reverse thrust of the jet engines to reduce speed. Further, and the wheel brake can be used only after the speed is greatly reduced by the air resistance of the flap, thus necessitating a long running distance.

Normally, on take off an airplane having fixed wings, supported by a landing gear, utilizes the thrust force of the engine; however, it requires a long runway to reach takeoff speed.

At the time of landing, the airplane descends by gradually reducing engine power and then lands on the runway using the landing gear. At this time, the stationary tire touches the runway with a great impact, and generates white smoke, when beginning to turn, due to the shock of landing causing heat adhesion to the runway and also damage to itself.

Airplanes, which are the fastest means of transportation, to meet with the growing demand for international transportation in shorter times, are being designed in larger sizes for long-distance flights and a larger airplane needs a longer runway, consumes a larger volume of fuel, and generates more noise in the vicinity of the airport.

SUMMARY OF THE INVENTION

The present invention solves the foregoing problems by providing a compact, high-torque, high-speed drive unit/pneumatic actuator for the wheel unit of an airplane landing gear to secure safety at the time of takeoff and landing. At the time of taking off, the drive unit/pneumatic actuator of the present invention accelerates the airplane with a strong torque and, at the time of landing, reduces the shock to the tire by turning the wheel at a high speed equal to or approaching landing speed prior to landing, and functions as a vacuum brake by reducing the speed of the airplane immediately after landing.

The pneumatic actuator (motor) of the present invention uses a (first) impeller, operating as an expander, which is driven at a high speed by the velocity of the compressed air as a primary force (velocity energy) and uses a turbine-type impeller which is driven by the air exhausted from the first impeller and undergoing expansion (pressure or expansion energy), and thus transmits a powerful torque and high-speed rotation to the wheel. In this way it serves a constant-velocity, high-performance pneumatic motor.

The pneumatic actuator configured as described above is a pneumatic motor having a series of drive impellers by which a large volume of compressed air is fed, via the first impeller, to an expansion chamber within the casing, wherein it is expanded. The expanding air then passes through the second impeller. This pneumatic motor/actuator has an impeller rotational speed that is inversely proportional to the decrease of load resistance of the wheel and to the energy of the compressed air fed thereto. The synergy of the above two phenomena results in continuous acceleration of the wheel with no reduction in the torque of the impeller as the rotational speed of the wheel increases.

Furthermore, the present invention provides (1) a drive unit which drives the wheel with an ultra-high rotary speed that can match the speed of the airplane upon landing, and a strong drive force which assists the airplane to run on the runway at high speed upon takeoff and (2) a compact, continuous-velocity wheel unit which takes only a short time from start-up to reach its maximum power.

In the present invention, in order to realize the above features, vanes of the first impeller are fixed within a speed ring in the form of a three-sided, annular enclosure and the turbine-type vanes of the second impeller are fixed to an interior cylindrical surface of the speed ring and extend radially inward thereof. Thus, in the preferred embodiment, the first and second impellers are integrated with the speed ring into a single, integral ("double turbine") unit, whereby the first and second impellers are fixed together and rotate together. The speed ring is mounted in a round housing formed in the periphery of the casing and providing an airtight covering so that the compressed air introduced into the side of the round housing flows through and drive the first impeller, then enters the expansion chamber, which is open on one side to the second impeller fixed to the interior of the speed ring, and then passes through the second impeller. The inner ends of the vanes of the second impeller are fixed to the wheel axle, whereby the turning of the speed ring with the first and second impellers drives the wheel.

Furthermore, a fan-blade-type third impeller having a plurality of long, thin vanes is mounted on and fixed to the wheel axle, within an exhaust opening of the casing, so that compressed air which is exhausted at a high velocity may be discharged smoothly to the outside, and the wheel is attached to the flange of the impeller so that they turn together.

Furthermore, a fixed vane is mounted between and coaxial with the second and third impellers so that air flow therebetween is straightened and vibration of the impellers is suppressed.

One advantage of the actuator of the present invention is that there is no upper limit on its rotary speed. In contrast, electric motors and internal combustion engines, for example, have a maximum speed of revolution due to load resistance and, hence, are inappropriate for the landing gear of an airplane.

DETAILED DESCRIPTION OF THE PREFERRED EMBODIMENT

A preferred embodiment of the present invention will now be described with reference to the drawings.

Figure 1:
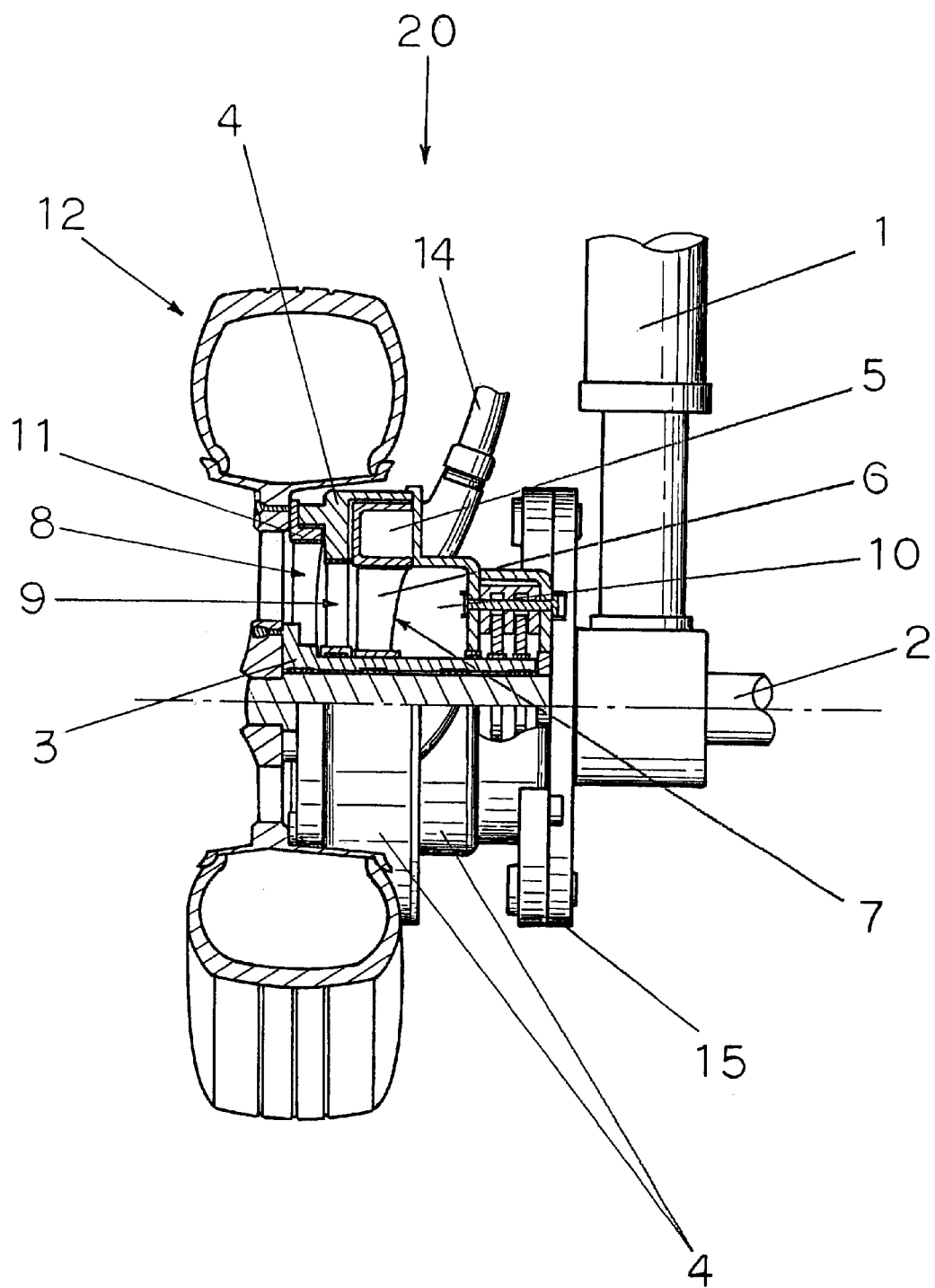
FIG. 1 shows an embodiment of the present invention, partially in cross-section.

As shown in FIG. 1, the wheel unit 20 of the present invention is attached to the landing gear of airplane. The wheel unit 20 is shown as including a rotor 3 rotatably supported by an axle 2 through several press-fit beatings. The axle 2, in turn, is supported at the end of a pillar 1. Turbine 7 has moving vanes 5, which are turned by the pneumatic energy (pressure or expansion) of compressed air, and vanes 6, are also driven by the compressed air, and are attached at their inner ends to the rotor 3 to form a double turbine structure for turbine 7. Vanes 5 and 6 of turbine 7 rotate together and are integrated together with a speed-ring 21. The periphery of turbine 7 is covered airtight by a casing 4 that is fixed to a flange 15 at the base of the pillar 1.

Another bladed turbine 8 is mounted in the opening of the casing 4 and a wheel 12 is fixed on the flange of the rotor 3 and the flange of the rim 11 of the turbine 8, and thus the rotor 3 turns together with the turbines 7 and 8. A fixed vane 9 is provided between, i.e., axially intermediate, the turbines 7 and 8 so that compressed air supplied via an air inlet 14 of the casing may flow into an expansion chamber 10 via moving vanes 5, through vanes 6 and then through fixed vane 9 to condition (straighten) the flow of air and suppress the vibration of the impellers.

Figure 2:
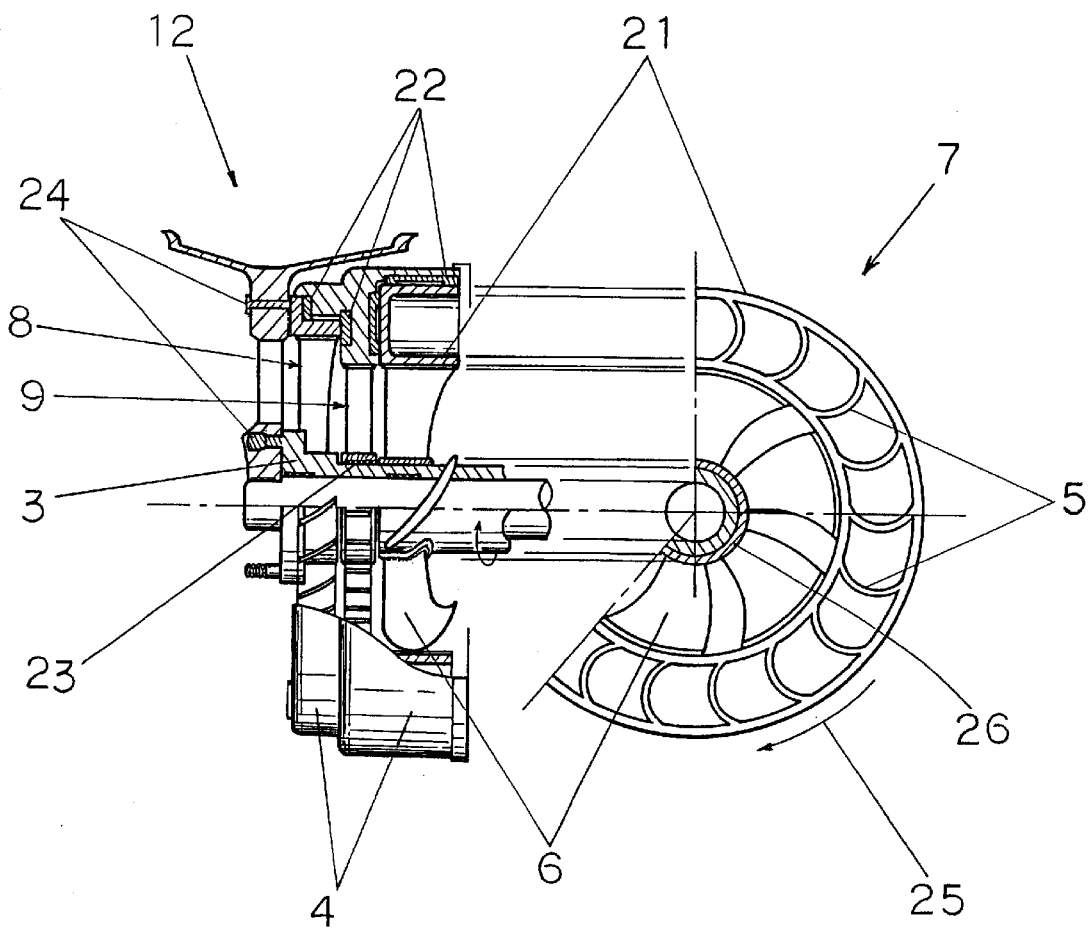
FIG. 2 shows the impeller of the embodiment of FIG. 1.

FIG. 2 shows the turbine 7 of the embodiment of FIG. 1.

As shown in FIG. 2, curved vanes 5 are attached in a predetermined spacing to a speed ring 21 which is enclosed by metal sheets on three sides in turbine 7. The other side of the speed ring is covered airtight by the wall of the casing 4, and the vanes 5, together with the speed ring 21 are turned in the direction indicated by an arrow 25 by the pneumatic energy of compressed air.

Moreover, the moving, wide turbine-type vanes 6 are attached inside of the speed ring 21, fixed at their radially inner ends to a boss 26, and fixed at their outer ends to the speed ring 21 so that they turn together with the vanes 5 and speed ring 21.

The impeller 8 mounted in the opening of the casing 4 is a fan-blade-type turbine having many slightly curved thin blades and is attached to the end of the rotor 3. A wheel 12 is fixed to the flanges of the rim of the impeller 8 and to the boss of the rotor 3 by bolts 24.

Moreover, the fixed vane 9, mounted between the impeller 7 and impeller 8, is fixed to a wall of the casing 4 and securely supports the axle of the rotor 3 through ball bearings in the boss of the fixed vane and bearing 23.

Furthermore, several oil-groove rings 22, made of abrasion-resistant hard alloy, are fitted on the inside of the crucial portions of the casing at which abrasion may occur due to friction between the rim of an impeller, which turns at a high speed, and the casing.

Figure 3:
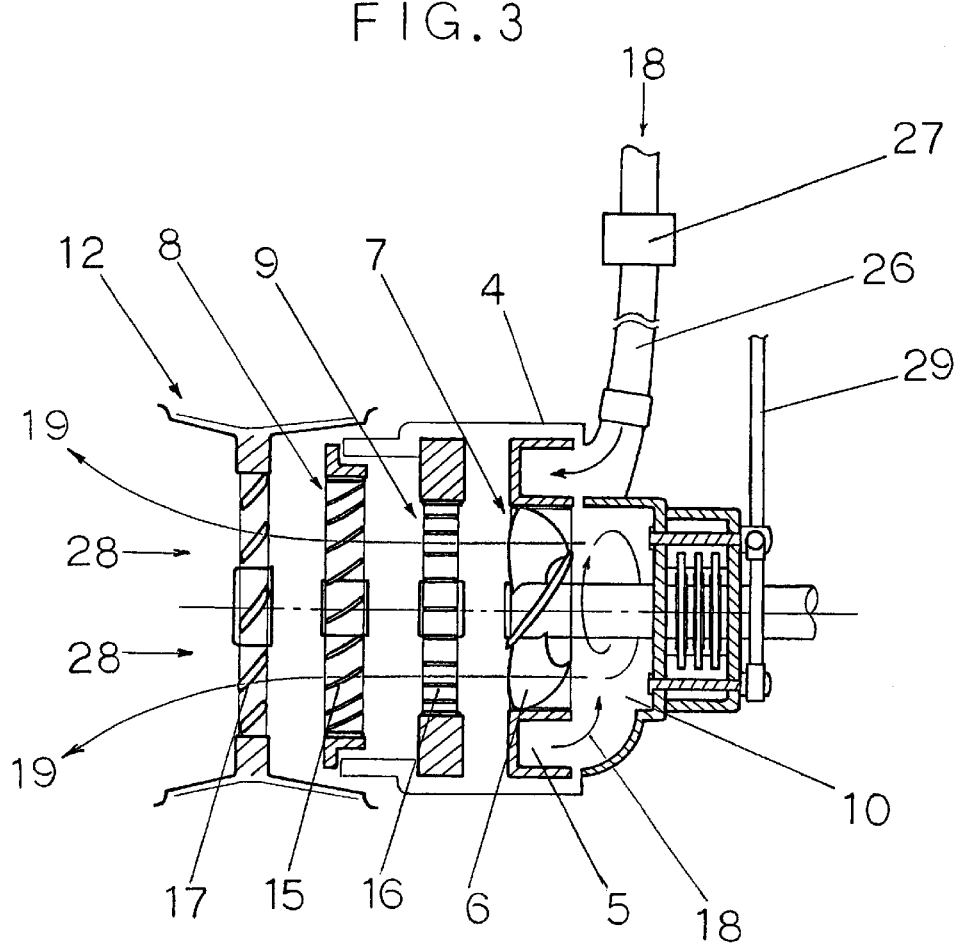
FIG. 3 illustrates the flow of compressed air in the embodiment of FIG. 1.

FIG. 3 shows the flow of compressed air through the impeller structure shown in FIGS. 2. When compressed air, indicated by an arrow 18 is introduced via a connection tube 26 of the pneumatic circuit attached on the side of the casing 4, it rotatably drives the impeller (vanes) 5, then flows into the expansion chamber 10 of the casing, wherein it quickly expands with a swirl, and then passes through vanes 6. In this manner it turns the impeller 7 and impeller 8, and then flows out of the casing as indicated by an arrow 19.

The above described air flow generates a swirl, which vibrates the impellers, by expansion within the expansion chamber 10. Therefore, the fixed vane 9 having a plurality of blades 16 at a predetermined spacing and parallel to the air flow is mounted between the impeller 7 and impeller 8 to straighten the flow of air.

Moreover, vanes 17 formed within a wheel 12 must turn the wheel and, at the same time, negate the friction between the exiting compressed air and the ambient air and, at the same time, maintain the strength of the wheel. Accordingly, vanes 17 are propeller-type vanes having a curved, thick cross-section and are designed to reduce friction with ambient air which enters, indicated by an arrow 28, when the pneumatic motor is used as a vacuum brake.

To provide a vacuum brake, a shut-off valve 27 attached to the connection tube 26 of the pneumatic circuit is closed immediately after landing. As the impeller is turned at a high speed by the force of the wheel running on the runway, air is discharged from the interior of the pneumatic motor to create a vacuum therein and, combined with the air resistance of the impeller, provides braking.

While two impellers and one set of fixed vanes have been described by way of example, as one embodiment of the present invention, in an actual application, several different combinations are possible, depending on the model and purpose of the airplane, and in some cases, the form of the impeller may need to be modified.

Figure 4:
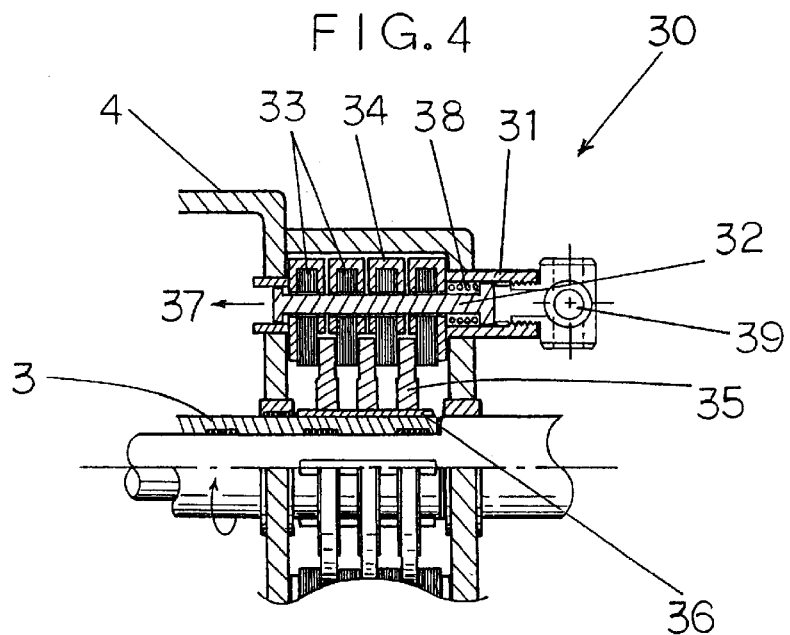
FIG. 4 is a cross-sectional view of the brake unit of the embodiment of FIG. 1.

FIG. 4 shows a unique mechanical brake 30 which cooperates with the vacuum brake and which includes several brake disks 35 which are attached to the rotor 3 and which are sandwiched between brake pads 33 held by multiple calipers 34 attached to the piston shaft 32 of a pneumatic cylinder 31. The brake pads 33 engage and release the brake disks 35 according to the movement of the piston shaft, and the brake disks 35 slide on a key 36 formed on the rotor 3.

The mechanical brake is so designed that, when the pressure in the casing is reduced to a predetermined value, the brake disks 35 are gripped by pads 33 by pulling the piston shaft 32 in the direction indicated by an arrow 37 and, at the same time, this operation adjusts the pressure with a spring 38 fitted in a cylinder 31 acting as a safety valve for the casing.

Consequently, the higher the speed of the airplane, the stronger the braking action of the pneumatic motor. Conversely, as the airplane's running speed decreases, the brake releases naturally and, therefore, if set according to the landing speed of the airplane, it functions automatically.

Moreover, when the pneumatic motor is used as an ordinary mechanical brake, the pneumatic circuit must have the cylinder 31 connected to the pressure controller of the airplane so that it can be controlled from the cockpit.

Figure 5:
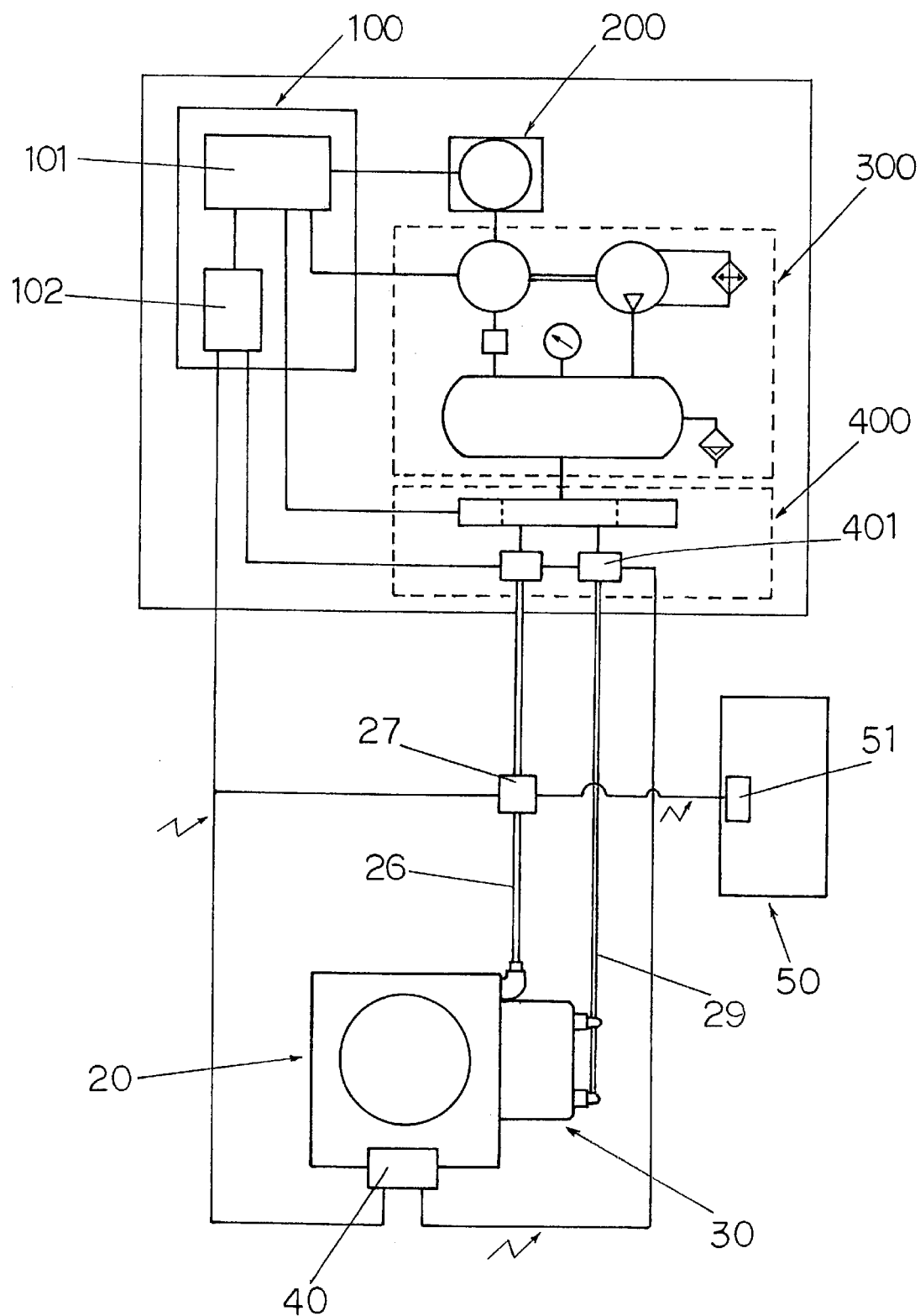
FIG. 5 shows the pneumatic circuit and control system for the embodiment of FIG. 1.

FIG. 5 shows the pneumatic circuit connected to a wheel unit 20 and its control system. A shut-off valve 27, attached to the connection tube 26 of the pneumatic circuit, is an electromagnetic valve which closes the connection tube responsive to an electric signal sent from a pressure sensor 51 incorporated into the hydraulic damper of landing gear 50. The pressure sensor 51 detects that the airplane has landed and has begun running on the tarmac and sends a signal to that effect, so that the shut-off valve 27 then closes the pneumatic circuit that has been driving the wheel turn at a high speed in accordance with the landing speed. The pneumatic motor then changes over to operate as a vacuum brake by utilizing the turning force of the wheel on the tarmac, thus reducing the speed of the airplane.

A velocity sensor 40 is incorporated into the wheel unit to analyze the relationship between the pressure control valve and wheel and controls the turning of the wheel responsive to electric signals from a computer 102 of the pneumatic circuit and a feedback signal via a pressure control valve 401.

Moreover, the electric circuit which connects to the pressure sensor 51 to the shut-off valve 27 is also connected to the electric circuit connecting the computer 102 to the velocity sensor 40; and these signals are sent to the computer 102 which controls the acceleration and high-speed turning of the wheel at the time the airplane takes off or lands and also controls the vacuum brake after landing.

Furthermore, the mechanical brake 30 which can be used as an ordinary brake is connected to a pressure control valve 401 via an independent pneumatic circuit 29 and can be directly controlled from the cockpit.

A pneumatic pressure source 300, pressure control unit 400, pressure control valve 401, computer system 101 in the cockpit, computer 102 of the pneumatic circuit, and power supply shown in FIG. 5 are all equipment installed inside the airplane; and this equipment is connected via electric circuits so that they can be controlled from the cockpit 100.

The pneumatic circuit connected to the wheel unit of the present invention is disclosed in my Japanese Patent No. 3053090 issued Apr. 7, 2000 and entitled "Landing Gear and Control System of Airplane," the teachings of which are incorporated herein by reference.

The present invention is an improvement over the pneumatic motor, pneumatic circuit and control system of Japanese Patent Number 3052090, in that it provides torque and turning speed and the additional feature of operation as a vacuum brake.

As mentioned above, by installing the pneumatic motor in the wheel unit of an airplane, the running speed of the airplane can be controlled by the drive force on the wheel, which can not be done with the conventional wheel unit. Thus, the runway running distances of large commercial passenger airplanes, and large military airplanes can be reduced which, in turn, can reduce the cost of airport construction and reduce fuel consumption as well as enlarge the range of services of existing airports.

Furthermore, the pneumatic motor is compact and lightweight and ideally suited for the wheel unit of an airplane, and can generate the strong torque and very high speed which are needed for the speed of an airplane, with fast acceleration from its initial velocity to maximum output.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A wheel unit for an airplane landing gear, said wheel unit comprising:
    at least one wheel having a rim portion with a ground-engaging tire mounted thereon, said one wheel being fixed to a wheel axle for rotation therewith;
    a pneumatic motor for rotatably driving said wheel, said pneumatic motor comprising:
        a first impeller fixed to said wheel axle for rotation therewith;
        a compressed air inlet for feeding compressed air to said first impeller thereby driving said impeller;
        an expansion chamber for receiving and expanding compressed gas exiting said first impeller; and
        a second impeller fixed to said wheel axle, said second impeller being driven by expanding air from said expansion chamber.

2. A wheel unit according to claim 1, wherein said pneumatic motor further comprises a casing housing said impellers and a shut-off valve for shutting off feed of the compressed gas whereby said pneumatic motor serves as a vacuum brake when said wheel is rotatably driven by ground contact in landing the airplane.

3. A wheel unit according to claim 2 further comprising a disc brake, which cooperates with the vacuum brake, on said wheel axle.

4. A wheel unit according to claim 1 further comprising a third impeller fixed to said wheel axle and driven by exhaust from said second impeller.

5. A wheel unit according to claim 1 wherein said first impeller is formed of vanes fixed within an annular space within a three sided speed ring and said second impeller is formed of turbine blades, each of said turbine blades fixed at one end to said speed ring and extending radially inward from said speed ring to a second end fixed to said wheel axle; and
    wherein said expansion chamber is contiguous with and opens to said second impeller.

6. A wheel unit according to claim 5 wherein a wall of said speed ring serves to separate the path of air through said first impeller driven primarily by the velocity energy of the air from the path of air through said second impeller driven primarily by the expansion energy of the air.

* * * * *